United States Patent
Bango, Jr.

(10) Patent No.: US 6,368,526 B1
(45) Date of Patent: *Apr. 9, 2002

(54) METHOD AND MEANS OF RESTORING PHYSICALLY DAMAGED COMPACT DISCS

(76) Inventor: Joseph J. Bango, Jr., c/o Conn. Analytical Corp., 696 Amity Rd., Bethany, CT (US) 06524

( * ) Notice: Subject to any disclaimer, the term of this patent is extended or adjusted under 35 U.S.C. 154(b) by 0 days.

This patent is subject to a terminal disclaimer.

(21) Appl. No.: 09/587,123

(22) Filed: Jun. 2, 2000

Related U.S. Application Data

(63) Continuation-in-part of application No. 09/002,878, filed on Jan. 5, 1998, now Pat. No. 6,086,797.

(51) Int. Cl.[7] .......................... B29D 11/00; B29C 73/02
(52) U.S. Cl. ..................... 264/36.1; 264/1.33; 264/341; 425/445; 425/810
(58) Field of Search ................................ 264/1.33, 341, 264/106, 107, 36.1; 425/445, 810

(56) References Cited

U.S. PATENT DOCUMENTS

| | | | |
|---|---|---|---|
| 4,260,873 A | 4/1981 | Simmonds | 219/273 |
| 4,302,418 A | 11/1981 | Cullis | 264/341 |
| 4,376,751 A | 3/1983 | Duchane | 264/341 |
| 4,654,917 A | 4/1987 | Yeung | 15/97 R |
| 4,783,870 A | 11/1988 | Yeung | 15/97 R |
| 5,334,335 A | 8/1994 | Norville | 264/36 |
| 5,337,524 A | 8/1994 | Norville | 51/391 |
| 5,407,615 A | 4/1995 | Norville | 264/36 |
| 5,448,838 A | 9/1995 | Edmonds | |
| 5,641,345 A | 6/1997 | Henry | 106/10 |
| 6,086,797 A | * 7/2000 | Bango, Jr. | 264/1.33 |

FOREIGN PATENT DOCUMENTS

| | | |
|---|---|---|
| WO | WO 95/21890 | 8/1995 |

OTHER PUBLICATIONS

Smooth Surfaces Mech. Engineering, 1981, Duchane, David, p. 68.

Smooth Surfaces Chem. Engineering, 1985, Duchane, David, p. 15.

* cited by examiner

*Primary Examiner*—Mathieu D. Vargot

(57) ABSTRACT

An improved method and means for eliminating scratches and other mechanical surface damage from polycarbonate compact disc plastic surfaces. The method consists in applying a liquid of suitable composition to the surface of a compact disc or plastic object, allowing an average of 10 seconds or less for the solvent to soften the plastic substrate, and removing the liquid by draining and evaporation. No abrasive, filler or polishing compounds are required. Suitable liquids include those comprising a solvent for the plastic and a non-solvent diluent and a small quantity of surfactant.

4 Claims, No Drawings

METHOD AND MEANS OF RESTORING PHYSICALLY DAMAGED COMPACT DISCS

This application is a CIP of application Ser. No. 09/002,878, filed Jan. 5,1998 now U.S. Pat. No. 6,086,797.

BACKGROUND—FIELD OF THE INVENTION

This invention relates in general to removing scratches from plastic surfaces, and in particular to a method and means which restores such discs damaged due to scratches and other surface imperfections.

BACKGROUND DESCRIPTION OF PRIOR ART

This invention relates to producing smooth surfaces on substrates of plastic materials. In particular it provides a method for repairing damage due to scratches or other imperfections on the surface of plastic storage media for digitally encoded information of the type commonly embodied in so-called Compact Discs or CDs. Compact discs or CDs as they are commonly called, are optically encoded digital storage media. The physical structure of the disc is composed of a polycarbonate plastic known under the trade name of Lexan TM, a product of General Electric Corporation. Fabrication of a CD is accomplished by injecting molten polycarbonate into a cavity where micro pits are formed which represent encoded information. These micro pits are arranged in spiral data track. The side where the micro pit track has been formed is coated with a thin layer deposition of metal, usually aluminum or gold, to make the surface reflective. Subsequent treatment involves adding a lacquer coating over the delicate reflective surface as a protective layer followed by a silk screened label.

The polycarbonate is used both as a support structure and as an optical window through which a laser is focused on the reflective layer containing the data tracks. Each pit in the track varies in length according to the encoded digital data. Depending on whether the laser light is scattered or reflected back is related to pit presence and length and provides the basis for recovering a digital data stream which represents the desired recorded information.

Anything which interferes with the ability of the laser scanning system to focus on the encoded pits can lead to data loss. Scratches, debris and even oil deposits from finger prints all have the potential to cause such data interruption. To minimize the effect of minor laser obstruction, CD playback systems typically employ an electronic data interpretation algorithm which can recover lost information.

Despite error correction schemes, ordinary handling of compact discs can lead to minor or severe mechanical surface damage as a result of contact with abrasive particulate matter or by simply allowing one CD to be placed in sliding physical contact with another CD. Accumulation of this damage can exceed the error correction capabilities of the CD reader hardware and software, especially if a scratch or combination of scratches occurs in a curvilinear rather than a radial orientation. Due to the sequential nature of the encoded data, such damage renders vast amounts of information unavailable for error correction, ultimately rendering the optical disc useless. The net effect is a costly loss of data such as in CD ROM library databanks. The only recourse left to the user faced with such damage is the purchase of a replacement disc, if available.

Since the compact disc is fabricated from plastic, means used to polish plastic have been attempted in an effort to remove scratches and other surface imperfections. There have been a variety of attempts to develop procedures that will remove scratches and other mechanical surface defects from CDs. Many of the proposed approaches involve polishing with fine abrasives dispersed in a lubricant to remove surface irregularities, sometimes with a deformable material to fill in unwanted scratches or pits. For example, U.S. Pat. Nos. 5,334,335, 5,337,524 and 5,407,615 issued to W. C. Norville, disclose various formulations of abrasives, solvents, fillers and lubricants designed to abrade surface projections and fill in pits and scratches in plastic surfaces including compact discs. However, it is difficult to produce a smooth surface finish on polymeric materials by abrasion, in part because they are too soft and flexible to abrade readily and in part because they are not good thermal conductors and therefore do not dissipate frictional heat very effectively. The resulting temperature rise can soften the plastic and result in gumming and poor finish control, as discussed in Modem Plastics Encyclopedia, pp. 533–536, S. Gross, Editor-in-Chief (McGraw-Hill, N.Y., 1974). Also to be remembered in the case of CDs is that removal of material from the surface of the disc by abrasion or polishing can cause permanent local variations in disc thickness. Thickness irregularities can result in focus error and data loss. Furthermore, any filling of pits and scratches can also cause data loss due to possible laser scatter at the transitional interface between the plastic media and a filler agent.

U.S. Pat. Nos. 4,654,917 and 4,783,870 to C. K. Yeung disclose an apparatus that combines rotation of a CD with radial motion of a pad so that the entire surface of the disk can be evenly rubbed by the pad, after it is soaked with a cleaning solution, to remove fingerprints, oil deposits, and dust particulates or other debris. Neither disclosure offers a means to rectify the deleterious effects of scratches or other disc surface damage.

International Application WO 95/21890 by M. J. Smithlin, published on Aug. 17, 1995, also describes a composition and a method for repairing a CD. The composition comprises a mixture of a wax with a refractive index which approximates that of CD polycarbonate, a solvent for the wax, some fine abrasive material and an emulsifier to keep the abrasive in suspension. The solvent must be one that does not soften or dissolve the disc material. A small amount of the mixture in paste or liquid form is applied to the disc surface and gently rubbed with a soft cloth or other applicator until the defect is smoothed and filled. The disc is considered repaired when examination with a microscope indicates that the edges of the scratch are beveled or rounded and the scratch is filled with the composition. It should be noted that this method does not remove particulate matter produced as the result of a scratch or other surface damage or take into account that surface damage often has light scattering effects not addressed by a filler agent. Further, this method must be considered as a temporary repair because such filler can often be easily dislodged.

Several investigators have taken a different approach in which the plastic is softened in a controllable manner so that surface tension forces can reduce the surface area, thereby smoothing surface projections and scratches. D. Duchane in U.S. Pat. No. 4,376,751 and in an article in Materials Engineering, vol. 9, No. 4, p 68 (1981) decribes a method in which the object with a plastic surface is immersed in a solution of solvent in a non-solvent diluent. Over a period of hours the concentration of solvent in non-solvent diluent is slowly decreased to zero. This procedure is intricate, lengthy, and consumes a substantial amount of solvent per treatment. Further, a significant amount of nonsolvent may be permanently incorporated into the polymeric article, an undesirable result in the case of a CD. The process assumes that a slow removal of solvent is necessary to prevent recurrence of the surface defects. Indeed, Duchane has asserted that "methods in which solvent is allowed to evaporate from a plastic surface are so fast that surface wrinkling occurs."(Chemical Engineering, Nov. 25, 1985, page 15.)

U.S. Pat. No. 4,260,873 to M. R. Simmonds and U.S. Pat. No. 5,448,638 to Edmonds both describe a method in which heated solvent vapor partially dissolves a plastic surface, softening it sufficiently so that surface tension forces will tend to decrease the surface area and thus smooth the plastic surface. A fairly complex and expensive apparatus is required and it is difficult to control the extent of vapor penetration by manipulating the vapor pressure, temperature and duration of exposure, so as to preclude crazing and stress cracking.

U.S. Pat. No. 4,302,418 to Cullis discloses a process where a fluid medium is used for polishing plastic surfaces made of a material which is insoluble or inert within that fluid medium unless subjected to a temperature at which plastic deformation would occur. The process includes employing a solvent vapor at an elevated pressure to liquefy a plastic surface without causing total plastic component deformation. This method requires complex temperature and pressure regulation and can result in stress crazing of plastic media or could cause a transparent plastic media to become opaque. Further, use of solvent vapor will render a plastic surface susceptible to contamination by dust or particulate matter when can become permanently embedded on the surface of the plastic media being treated. Finally, the required apparatus is expensive and the process is time consuming.

Examination of the prior art as set forth in the cited references indicates that all of the previously proposed methods for producing smooth surfaces on plastic materials comprise fairly slow and complex procedures and are not particularly effective. By contrast the method of the present invention achieves the same objectives by a procedure that is simple, rapid, uses minimal amounts of reagents and requires no special apparatus.

BRIEF DESCRIPTION OF THE INVENTION AND ITS OBJECTS

The present invention permits scratch and minor surface imperfections of plastics to be substantially reduced or eliminated by the simple application of an appropriately diluted solvent solution. A small amount of restoring liquid having a suitable composition is applied to the damaged surface. The excess liquid is wiped off and residual liquid is permitted to evaporate. The whole procedure, from application of the restoring liquid until the plastic surface is smoothed, requires only seconds. The key discovery underlying the invention relates to the "suitable composition" of the restoring liquid. It must comprise a mixture of which at least one component species is a solvent capable of dissolving or substantially softening the plastic surface to be repaired. The liquid must also comprise one or more non-solvent components which serve to dilute the solvent component, thereby reducing its dissolving activity or rate. When the restoring liquid contains the right proportions of these components its application and subsequent removal by wiping and evaporation will result in a smooth surface essentially free of undesirable scratches or other surface imperfections.

One object of the invention is to restore to its original smoothness, the marred surface of an article whose outermost layer comprises a polymeric substance of the type commonly characterized as a "plastic" or "thermoplastic" material.

Another object of the invention is to provide a simple, safe, rapid, convenient and inexpensive means of smoothing the surface of plastic objects.

Another, and particular, object of the invention is to provide a means of restoring to useful operability a thermoplastic recording medium such as a Compact Disc or CD whose surface has been damaged by scratches so that optical distortion, and/or reduction of transparency of the media prevents adequate recovery of encoded information.

Still other objectives and possible applications of the invention will become evident to those knowledgeable in the related arts.

DETAILED DESCRIPTION OF THE INVENTION

The following example illustrates the practice of the invention in a preferred embodiment. A compact disc fabricated from polycarbonate plastic was deliberately damaged using a fine Scotch Brite® abrasive pad to deliberately impart scratches in a circular pattern. The damage made the disc totally unreadable by a compact disc electronic player. A restoring liquid was prepared by blending 15 parts (by volume) of methylene chloride, 30 parts of water and 55 parts of specially denatured alcohol (SDA-3C from Eastman Chemical Corp. Kingsport, Tenn., comprising by volume: 80.1 percent of ethanol, 7.3 percent of water and 4.6 percent of isopropanol). A small amount of the resulting liquid mixture was poured onto the disc requiring restoration. After about 10 seconds the liquid mixture was wiped away with an optical grade adsorbent cloth or tissue which served as a wick. Such treatment restored the disc surface to new or nearly new condition and functional performance was also restored. If the content of methylene chloride in the restoring liquid was increased from 15 to above about 16 percent by volume, the transparency of the disc plastic could became degraded by crazing or hazing within hours after treatment. If the content of methylene chloride was decreased below about 13 percent by volume, the disc remained unreadable after treatment and no improvement in surface finished was observed. Treatment of a disc surface using the preferred restoring liquid where abrasive or filler media had been added, resulted in that media being permanently embedded on the plastic surface. Rubbing the surface with such media could obviate any surface improvement achieved by using the treatment solution alone.

It is noteworthy that if the methylene chloride content were reduced below the preferable 13 parts to about 8 parts by volume, and the treatment solution temperature increased above ambient, some surface improved could be obtained.

Clearly, the relative concentrations of solvent and non-solvent diluent and temperature are of critical importance to the success of the procedure. It was also found that addition of a small amount of surfactant (FC-170C from 3M Specialty Chemicals Division, St. Paul, Minn.) seems to provide improved wetting of the plastic surface and more even spreading of the restoring liquid as well as improved evaporation of its volatile constituents. Denatured alcohol SDA 40 was found to be as effective a diluent as SDA-3C. Undenatured alcohol could be expected to work as well but is harder to obtain because of government regulations. Other suitable diluents will be obvious to those skilled in the art and can be established through suitable empirical testing.

An abraded polycarbonate surface was also treated with a restoring solution comprising approximately equal parts by volume of acetonitrile as the solvent and the same denatured alcohol (SDA-3C from Eastman Chemical Co,) as the diluent. The results were nearly as good as in the first example when methylene chloride was the solvent species. In another test a restoring liquid comprising equal parts by volume of acetone as a solvent and the same denatured alcohol as diluent improved the disc surface but not nearly as much as when methylene chloride or acetonitrile were the solvents. It is noteworthy that when the acetone was only slightly higher than 50 per cent by volume some hazing and crazing developed in the plastic within a few hours after treatment. When the acetone content was only slightly less than 50 percent by volume the restoring solution had little or no effect on the surface damage. Similar surface restoration, improved transparency of a piece of polymethylmethacrylate with a scratched surface. Unfortunately, the effectiveness of the treatment of such surfaces is not as easily or conveniently characterized as in the case of CD's of polycarbonate materials for which the readibility of encoded information is a very sensitive and qualitative test. Consequently, only few experiments were performed.

Three important conclusions can be drawn from these illustrative results and many others that will not be described: (1) Restoring liquids of suitable composition can be prepared which, when simply applied to the surface of a plastic object that has been damaged by scratches, can effectively restore that surface to a condition as good or better than it was before the damage occurred. (2) Not enough information is available to enable one to predict a priori and precisely what constitutes an "appropriate composition" for the restoring liquid, i.e. one that will achieve the desired smoothing and surface restoration without crazing or hazing.

(3) Use of an abrasive in an attempt to achieve improved results by polishing the plastic surface obviates any advantage obtained by treating the same plastic surface using disclosed restoring solution alone. (4) Therefore, until much more information and understanding is available one must resort to empirical testing to determine a "suitable composition" of restoring liquid for a particular kind of plastic surface. Fortunately, one does not have to work in complete darkness. For most plastic materials, information is available on their behaviour with most common solvents. Moreover, most chemists can identify several diluent non-solvent liquids with which any particular solvent is likely to be miscible. When the further considerations of volatility, toxicity, expense and packaging are taken into account, what might seem at the outset to be a bewildering array of possible combinations is rapidly reduced to relatively few. Consequently, a relatively modest amount of empirical testing will suffice to determine whether an appropriate composition for a particular plastic can be found with a reasonable expenditure of effort and what that composition is. Once such a composition has been identified for a particular type of plastic material, it can be used with various batches of that material from various suppliers with only modest "tuning" required to specify the optimum concentrations of the restoring liquid's constituents. In sum, those skilled in the relevant arts will easily be able to adapt the principles of the subject invention for particular materials and circumstances that require its capabilities.

I claim:

1. A method of restoring the damaged surface of a polycarbonate compact disc which comprises the following essential steps:

(a) preparing a restoring liquid comprising a solution containing as essential components a solvent for said polycarbonate and at least one diluent species that is volatile but not an effective solvent for said polycarbonate, said restoring solution being devoid of abrasive media and or filler wax;

(b) applying a portion of said restoring liquid solution to the damaged portion of the surface of said disc so that said surface is completely wet by said restoring liquid;

(c) removing the excess restoring liquid from said surface by draining and gently wiping as needed with a soft absorbent material;

(d) allowing said surface to dry by evaporation of any remaining restoring liquid.

2. A method as in claim 1 in which the restoring liquid is a solution containing methylene chloride as the solvent species with water and ethyl alcohol as the principal diluent species.

3. A method as in claim 1 in which the restoring liquid comprises methylene chloride as the solvent species and ethyl alcohol as the diluent species, the concentration of said solvent species in said restoring liquid being between 8 and 20 percent by volume.

4. A method as in claim 1 in which the restoring liquid comprises acetonitrile or acetone as the solvent species and the diluent species comprise ethanol and water.

* * * * *